(12) United States Patent
Alvanos et al.

(10) Patent No.: US 8,511,986 B2
(45) Date of Patent: Aug. 20, 2013

(54) BEARING MOUNTING SYSTEM IN A LOW PRESSURE TURBINE

(75) Inventors: Ioannis Alvanos, West Springfield, MA (US); Gabriel L. Suciu, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1437 days.

(21) Appl. No.: 12/001,130

(22) Filed: Dec. 10, 2007

(65) Prior Publication Data

US 2009/0148271 A1 Jun. 11, 2009

(51) Int. Cl.
*F04D 29/04* (2006.01)

(52) U.S. Cl.
USPC .................................. 415/216.1; 415/229

(58) Field of Classification Search
USPC .................. 415/142, 229, 216.1; 416/198 A, 416/244 A
See application file for complete search history.

(56) References Cited

U.S. PATENT DOCUMENTS

| | | | | |
|---|---|---|---|---|
| 3,673,802 | A * | 7/1972 | Krebs et al. | 60/226.1 |
| 3,703,081 | A | 11/1972 | Krebs et al. | |
| 4,251,987 | A | 2/1981 | Adamson | |
| 4,433,955 | A * | 2/1984 | Johnston | 415/1 |
| 4,548,546 | A * | 10/1985 | Lardellier | 415/133 |
| 4,611,464 | A | 9/1986 | Hetzer et al. | |
| 4,659,289 | A * | 4/1987 | Kalogeros | 416/198 A |
| 4,979,872 | A | 12/1990 | Myers et al. | |
| 5,074,109 | A * | 12/1991 | Mandet et al. | 60/792 |
| 5,211,541 | A * | 5/1993 | Fledderjohn et al. | 416/198 A |
| 5,361,580 | A * | 11/1994 | Ciokajlo et al. | 60/226.1 |
| 5,588,293 | A * | 12/1996 | Nozu | 60/398 |
| 5,813,214 | A * | 9/1998 | Moniz et al. | 60/39.08 |
| 5,971,710 | A * | 10/1999 | Stauffer et al. | 416/191 |
| 6,708,482 | B2 * | 3/2004 | Seda | 60/226.1 |
| 6,732,502 | B2 * | 5/2004 | Seda et al. | 60/226.1 |
| 6,846,158 | B2 * | 1/2005 | Hull | 416/1 |
| 6,883,303 | B1 | 4/2005 | Seda | |
| 7,097,413 | B2 | 8/2006 | VanDuyn | |
| 7,097,415 | B2 | 8/2006 | Bart et al. | |
| 7,182,519 | B2 | 2/2007 | Singh et al. | |
| 7,882,693 | B2 * | 2/2011 | Schilling | 60/204 |
| 2006/0090448 | A1 | 5/2006 | Henry | |

FOREIGN PATENT DOCUMENTS

| | | |
|---|---|---|
| EP | 0389353 | 9/1990 |
| EP | 1316676 | 6/2003 |

OTHER PUBLICATIONS

Extended European Search Report from EP Application Serial No. 08253959.4, dated Oct. 31, 2012, 6 pages.

* cited by examiner

*Primary Examiner* — Nathaniel Wiehe
*Assistant Examiner* — Ryan Ellis
(74) *Attorney, Agent, or Firm* — Kinney & Lange, P.A.

(57) ABSTRACT

A bearing mounting system for use in a gas turbine engine having a low pressure turbine supported on a low pressure shaft through a support rotor comprises a low pressure turbine case, a forward bearing and an aft bearing, and a forward support structure and an aft support structure. The low pressure turbine case surrounds the low pressure turbine. The forward bearing and the aft bearing are positioned on the low pressure shaft to straddle the support rotor. The forward support structure and the aft support structure connect the forward bearing and the aft bearing, respectively, to the low pressure turbine case. The low pressure shaft extends axially between the forward bearing and the aft bearing. In one embodiment, the turbine comprises a plurality of adjacent rotor disks, and the support rotor comprises a conical support connecting one of the rotor disks with the shaft.

20 Claims, 3 Drawing Sheets

BEARING MOUNTING SYSTEM IN A LOW PRESSURE TURBINE

BACKGROUND

The present invention relates generally to gas turbine engines, and more particularly to a bearing mounting system for supporting a low pressure turbine in a gas turbine engine. A gas turbine engine typically includes a high pressure spool, a combustion system and a low pressure spool disposed within an engine case to form a generally axial, serial flow path about the engine centerline. The high pressure spool includes a high pressure turbine, a high pressure shaft extending axially forward from the high pressure turbine, and a high pressure compressor connected to a forward end of the high pressure shaft. The low pressure spool includes a low pressure turbine, which is disposed downstream of the high pressure turbine, a low pressure shaft, which typically extends coaxially through the high pressure shaft, and a low pressure compressor connected to a forward end of the low pressure shaft, forward of the high pressure compressor. The combustion system is disposed between the high pressure compressor and the high pressure turbine and receives compressed air from the compressors and fuel provided by a fuel injection system. A combustion process is carried out within the combustion system to produce high energy gases to produce thrust and turn the high and low pressure turbines, which drive the compressors to sustain the combustion process.

Compressors and turbines are comprised of alternating stages of blades and vanes that are arranged radially around a center axis of the engine within the axial flow path of the engine case. For example, in the low pressure turbine, blades are connected to the low pressure shaft such that they rotate about the engine centerline, while vanes are supported by the engine case such that they remain stationary between the blades. Engine efficiency depends greatly on the ability of the engine to pass airflow through the blades and vanes within the axial flow path without leakage. To increase efficiency, the radially outer end of the blades are designed to come into close proximity with the stationary engine case as the high energy gases from the combustion process rotate the turbines. Typically, a sealing system is provided to reduce leakage from around the tips of the blades. For example, an abradable seal is positioned on the inner diameter surface of the engine case above the low pressure turbine, and a knife edge is positioned on the tip of each of the low pressure turbine blades to seal the air flow path. The ability of this sealing system to function depends on the consistency with which the low pressure shaft rotates about the engine centerline.

In many conventional engines, the low pressure turbine is typically supported within the engine case by a support rotor connected near the aft end of the low pressure turbine. Typically, the aft end of the low pressure shaft is supported by a single bearing, often referred to as the number five bearing, positioned either forward or aft of the support rotor. The use of a single number five bearing, however, can result in rotor dynamics issues such as turbine instability and vibration. For example, a single bearing support can lead to forward or rearward tilting of the support rotor. Rotor tilt causes the turbine blades and the knife edge seals to pull away from the abradable material and the engine case, causing an air leak and decreasing engine efficiency. One factor contributing to rotor tilt is large amounts unsupported shaft length, which results from using a single bearing to support the low pressure turbine. Large unsupported shaft lengths not only increase shaft vibration, but also reduce the maximum rotational speed, or critical speed, of the shaft, thus limiting the operational speeds of the engine. Critical speed can be increased by increasing the diameter of the shaft, which unfavorably increases shaft weight and area.

Previous attempts have been made to support low pressure turbines using more than one bearing, but have resulted in overly complex systems that do not address rotor dynamics issues for turbines having a single support rotor. For example, U.S. Pat. No. 5,074,109 to Mandet et al. discloses a low pressure turbine having a rotor drum supported by two transverse elements, and a shaft supported by two bearings. Also, U.S. Pat. No. 5,813,214 to Moniz et al. discloses a low pressure turbine supported by a single rotor, an aft bearing supporting the low pressure shaft and a forward bearing supporting the high pressure shaft. There is, therefore, a need for a mounting system that improves rotor dynamics and engine efficiency in low pressure spool systems without increasing size, weight and complexity of the system.

SUMMARY

The present invention is directed to a bearing mounting system for use in a gas turbine engine having a low pressure turbine supported on a low pressure shaft through a support rotor. The bearing mounting system comprises a low pressure turbine case, a forward bearing and an aft bearing, and a forward support structure and an aft support structure. The low pressure turbine case surrounds the low pressure turbine. The forward bearing and the aft bearing are positioned on the low pressure shaft to straddle the support rotor. The forward support structure and the aft support structure connect the forward bearing and the aft bearing, respectively, to the low pressure turbine case. The low pressure shaft extends axially between the forward bearing and the aft bearing. In one embodiment, the turbine comprises a plurality of adjacent rotor disks, and the support rotor comprises a conical support connecting one of the rotor disks with the shaft.

DETAILED DESCRIPTION

Figure 1:
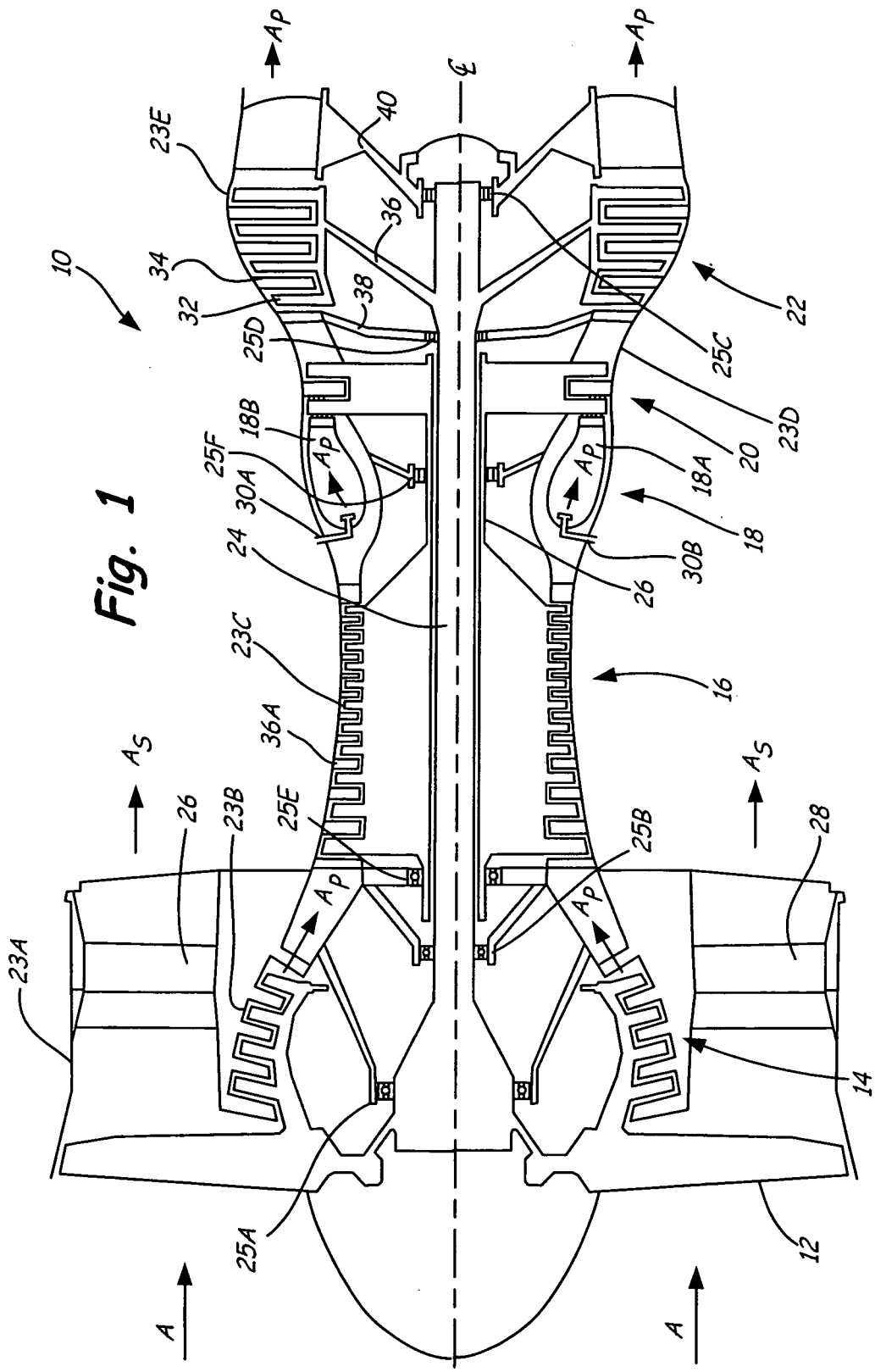
FIG. 1 is a schematic cross sectional view of a gas turbine engine in which a bearing mounting system of the present invention is used to support a low pressure turbine.

FIG. 1 shows a cross section of gas turbine engine 10 in which the bearing mounting system of the present invention is used. Although FIG. 1 depicts a gas turbine engine typically used for aircraft propulsion, the invention is readily applicable to gas turbine generators and other similar systems incorporating rotor-supported, shaft-driven turbines. Gas turbine engine 10 comprises a dual-spool turbofan engine in which the advantages of the present invention are particularly well illustrated. Gas turbine engine 10, of which the operational principles are well known in the art, comprises fan 12, low pressure compressor (LPC) 14, high pressure compressor (HPC) 16, combustor section 18, high pressure turbine (HPT) 20 and low pressure turbine (LPT) 22, which are each concentrically disposed around longitudinal engine centerline CL. Fan 12 is enclosed at its outer diameter within fan case 23A. Likewise, the other engine components are correspondingly enclosed at their outer diameters within various engine casings, including LPC case 23B, HPC case 23C, HPT case 23D (including the mid-turbine frame) and LPT case 23E. Fan 12 and LPC 14 are connected to LPT 22 through shaft 24, which is supported by ball bearing 25A and roller bearing 25B toward its forward end, and ball bearing 25C and ball bearing 25D toward its aft end. Together, fan 12, LPC 14, LPT 22 and shaft 24 comprise the low pressure spool. HPC 16 is connected to HPT 20 through shaft 26, which is supported within engine 10 at ball bearing 25E and roller bearing 25F. Together, HPC 16, HPT 20 and shaft 26 comprise the high pressure spool.

Inlet air A enters engine 10 whereby it is divided into streams of primary air $A_P$ and secondary air $A_S$ after passing through fan 12. Fan 12 is rotated by low pressure turbine 22 through shaft 24 to accelerate secondary air $A_S$ (also known as bypass air) through exit guide vanes 28, thereby producing a major portion of the thrust output of engine 10. Primary air $A_P$ (also known as gas path air) is directed first into low pressure compressor 14 and then into high pressure compressor 16. LPC 14 and HPC 16 work together to incrementally step up the pressure of primary air $A_P$. HPC 16 is rotated by HPT 20 through shaft 28 to provide compressed air to combustor section 18. The compressed air is delivered to combustor 18, along with fuel through injectors 30A and 30B, such that a combustion process can be carried out to produce the high energy gases necessary to turn high pressure turbine 20 and low pressure turbine 22, which is comprised of blades 32 and vanes 34. Primary air $A_P$ continues through gas turbine engine 10 whereby it is typically passed through an exhaust nozzle to further produce thrust.

As discussed above, gas turbine engine 10 includes a plurality of bearings to support the low pressure spool and the high pressure spool within fan case 23A, LPC case 23B, HPC case 23C, HPT case 23D and LPT case 23E. For the purposes of this application, bearing 25A is referred to as the No. 1 bearing, 25B as the No. 2 bearing, 25E as the No. 3 bearing, 25F as the No. 4 bearing, bearing 25D as the No. 5 bearing and bearing 25C as the No. 6 bearing. The selection of roller bearings, ball bearings or other bearing types depends on design needs, any of which can be used with the bearing mounting system of the present invention. The bearing mounting system of the present invention includes support rotor 36, which supports blades 32; forward strut 38, which supports the No. 5 bearing (bearing 25D); and aft strut 40, which supports the No. 6 bearing (25C). In one embodiment, bearing 25C and bearing 25D straddle LPT 22 and connect with LPT case 23E to improve rotor dynamics of LPT 22, which leads to improved efficiency of engine 10.

After being compressed in LPCT 14 and HPC 16 and participating in a combustion process in combustor 18 (FIG. 1) to increase pressure and energy, primary air $A_P$ flows through HPT 20 and LPT 22 such that blades 32 extract energy from the flow of primary air $A_P$. Primary air $A_P$ impinges on blades 32 to cause rotation of support rotor 36 and shaft 24. In order to maintain the efficiency of the combustion process it is necessary to seal the path along which primary air $A_P$ flows. It is particularly advantageous to seal at the free ends of vanes 34 and blades 32 as they extend from LPT case 23E and rotor 36, respectively. For example, in order to maintain the mechanical efficiency of engine 10 it is necessary to ensure that the energy put into primary air $A_P$ translates into useful work of rotating shaft 24. Any air allowed to escape LPT 22 by passing through the gaps at the free ends of blades 32 and vanes 34 reduces the efficiency of engine 10. Thus, it is desirable to maintain the gap between, for example, blades 32 and LPT case 23E as small as possible. Various sealing configurations, such as labyrinth, knife edge and brush seals, are provided to seal or reduce air leakage at these gaps. In order to assist in maintaining the desired clearance height of these sealing systems during various operating modes of engine 10, the LPT bearing mounting system of the present invention is used. Specifically, bearing 25D is positioned directly upon shaft 24 and is supported by forward strut 38 upstream of rotor 36. Bearing 25C is positioned directly upon shaft 24 and is supported by aft strut 40 downstream of rotor 36. The locations of bearings 25C and 25D, which straddle support rotor 36, maximize support of shaft 24 to reduce shaft vibration.

Figure 2:
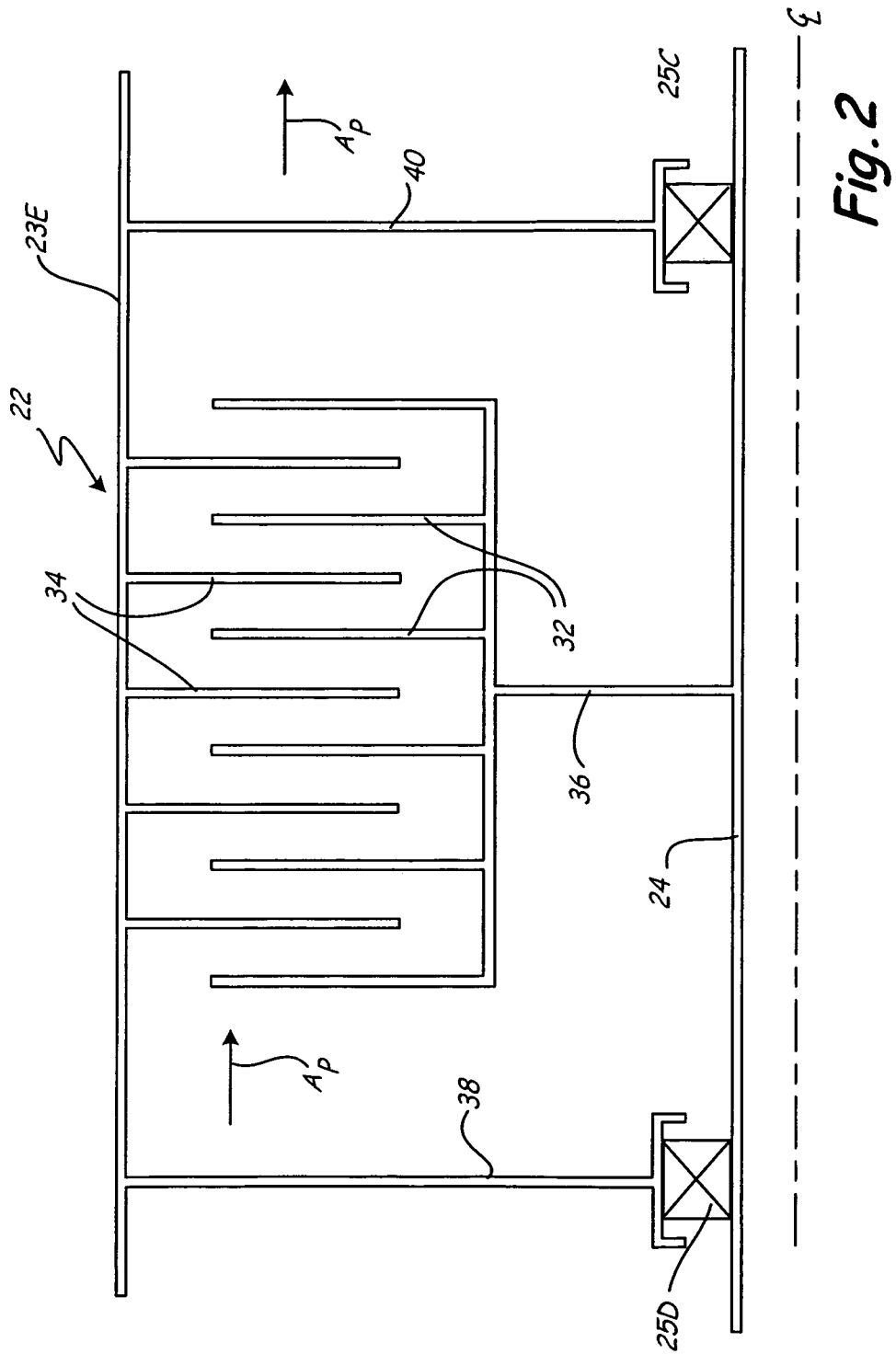
FIG. 2 is a diagrammatic illustration of the bearing mounting system of FIG. 1.

FIG. 2 is a diagrammatic illustration of low pressure turbine 22 supported within engine 10 by the LPT bearing mounting system shown in FIG. 1. LPT 22 is disposed between LPT case 23E and shaft 24, and comprises a plurality of blades 32 disposed between a plurality of vanes 34. Vanes 34 are suspended from LPT case 23 such that they remain stationary during operation of LPT 22. Blades 32 are connected to shaft 24 through support rotor 36 such that they rotate during operation of LPT 22. LPT case 23E is maintained concentrically disposed about shaft 24 by forward strut 38 and aft strut 40. Forward strut 38 and aft strut 40 maintain contact with and provide support to shaft 24 through bearing 25D and bearing 25C, respectively. As such, support rotor 36 is straddled by a pair of bearings to facilitate controlled rotation of shaft 24 and to promote sealing at the unsupported ends of blades 32 and vanes 34.

The forward and aft positions of bearings 25D and 25C provide improved rotor stability and enhanced tip clearance control for blades 32 by, among other things, reducing rotor tilt. The high rotational speed of shaft 24 results in rotational vibration and oscillation shaft 24. The vibration causes flexure of shaft 24, which causes arcuate tilting of support rotor 36 and LPT blades 32 with respect to engine centerline CL. The tilting of support rotor 36 results in radial displacement of support rotor 36, causing the distal tips of blades 32 to pull away from LPT case 23E, thus allowing primary air $A_P$ to escape without impinging upon blades 32. Rotor tilt and radial displacement of blades 32 is exacerbated by long lengths of unsupported shaft. The present invention helps to prevent tilt by providing increased support to low pressure shaft 24. In particular, bearing 25C and bearing 25D reduce the amount of unsupported shaft length of shaft 24 to reduce vibration of shaft 24.

A resulting benefit to reducing unsupported length of shaft 24 by locating bearings 25C and 25D forward and aft of support rotor 36 is an increase in the critical speed of low pressure shaft 20. The critical speed of a shaft is qualified as the maximum safe speed at which the shaft will rotate under operating conditions. Factors that influence critical speed of a shaft include shaft diameter, unsupported shaft length, material properties and torque loading. Providing two bearings that directly support shaft 24 from LPT case 23E reduces the amount of unsupported shaft length and thus reduces the capacity of shaft 24 to vibrate or fluctuate. This permits the critical speed of shaft 24 to be increased. Conversely, this permits the diameter of shaft 24 to be reduced while maintaining the same critical speed. As a result of the concentric arrangement between shaft 24 and shaft 26 (FIG. 1), this also allows the diameter of high pressure shaft 26 to be decreased as well. Decreasing the diameters of the respective shafts provides additional space within engine 10 to shift or accommodate other elements of engine 10 or to reduce the overall diameter of engine 10. The decrease in diameters also results in a net weight reduction for engine 10. Thus, by providing radial support to shaft 24 at positions forward and aft of support rotor 36, the efficiency of engine 10 is increased while reducing size and weight.

Figure 3:
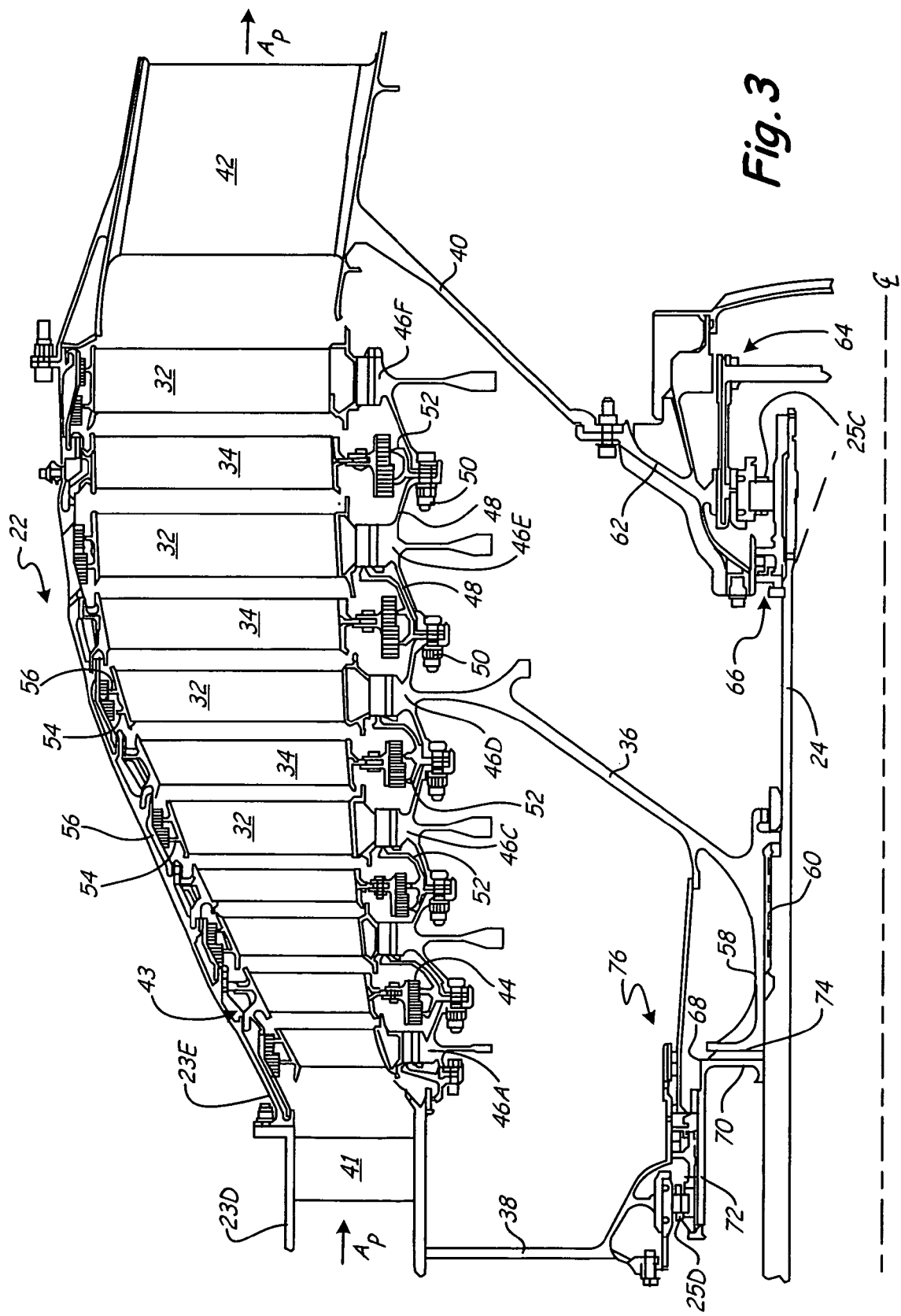
FIG. 3 is a schematic cross sectional view of a low pressure turbine including one embodiment of the bearing mounting system of FIG. 2.

FIG. 3 is a schematic cross sectional view of an exemplary bearing mounting system for low pressure turbine 22 of gas turbine engine 10 of FIG. 1. The bearing mounting system includes support rotor 36, forward strut 38 and aft strut 40, which illustrate the shaft-supporting and space-saving advantages of the present invention. Although LPT 22, including support rotor 36, forward strut 38 and aft strut 40, is not identically pictured in FIG. 3 as it is in FIG. 1, it performs an equivalent function for the purposes of the invention and illustrates another embodiment of the bearing mounting system of the present invention. Low pressure turbine 22 also includes LPT case 23E, shaft 24, forward bearing 25D, aft bearing 25C, LPT blades 32 and LPT vanes 34. LPT 22 is disposed within engine 10 between exit guide vane 41 for HPT 20 of case 23D, and exit guide vane 42 for LPT 22 of case 23E. Exit guide vane 41 is disposed between the outer diameter surface of case 23D and forward strut 38. The outer diameter end of exit guide vane 42 is connected to the aft end of LPT case 23E, while the inner diameter end is supported by aft strut 40. Forward strut 38 and aft strut 40 are supported on shaft 24 by bearing 25D and bearing 25C, respectively. Bearing 25D and bearing 25C are positioned forward and aft of support rotor 36 to reduce the amount of unsupported shaft length of shaft 24. As such, sealing elements of LPT blades 32 rotate between LPT vanes 34 with reduced separation from sealing elements on LPT case 23E, increasing the amount of primary air $A_P$ that impinges on LPT blades 32 and increasing the overall efficiency of engine 10.

The outer diameter ends of LPT vanes 34 are suspended from LPT case 23E, such as with hooked engagements 43. The inner diameter ends of LPT vanes 34 are provided with abradable seal members 44, which mate with knife edge seal elements of LPT blades 32. LPT blades 32 are connected at their inner diameter ends with a plurality of rotor disks 46A-46F. In the embodiment shown, there are six rotors comprising six blade and vane stages, but in other low pressure turbine designs more or fewer stages are used. Each rotor disk 46 includes axial extending arms 48, through which threaded fasteners 50 are inserted to secure rotors 46 to each other. As such, rotors 46 are maintained in an annular rotor stack that rotates as a unit about centerline CL. Between each adjoining arm 48 are positioned a plurality of knife edge seal elements 52 that abut with abradable seal members 44 of LPT vanes 34. The radially outer ends of LPT blades 32 are provided with knife edge seal members 54 that abut with abradable seal members 56 positioned on the inner surface of LPT case 23E. As such, the radial position of the stack of rotors 46A-46F is critical to maintaining proper sealing between knife edge elements 52 and 54 and abradable elements 44 and 56, respectively, as shaft 24 rotates within LPT case 23E. Rotors 46A-46F are supported inside LPT case 23E by support rotor 36, which extends to shaft 24.

Support rotor 36 connects the stack of rotors 46A-46F to shaft 24. In the embodiment shown, a single conical support rotor 36 is used to support LPT 22. It is desirable to use a single support rotor to support LPT 22 to reduce the overall weight of engine 10 and to reduce the rotating mass of LPT 22. The exact position of support rotor 36 depends on the specific design parameters of LPT 22. For example, placement of support rotor 36 is selected to balance rotors 46A-46C of LPT 22. In the embodiment shown, support rotor 36 extends from the fourth stage rotor 46D, which is most close to the center of mass of LPT 22 since the fifth and sixth stage blades outweigh the first through third stage blades. Thus, LPT 22 is balanced upon support rotor 36 such that tendency of rotor 36 to tilt forward or backward is reduced.

Support rotor 36 comprises a conical support that is integrally formed with fourth stage rotor 46D at its outer diameter end. The inner diameter end of support rotor 36 includes axial flange 58, which connects with shaft 24 through axial spline 60. Spline 60 prevents relative rotation between support 36 and shaft 24. Support rotor 36 maintains LPT blades 32 a fixed distance from shaft 24 and remains generally rigid as shaft 24 rotates during operation of engine 10. Shaft 24, however, is subjected to various dynamic forces that cause vibration in shaft 24, which affect the proper spacing of knife edge seal members 54 from abradable seal members 56. Shaft 24 is thus provided with forward strut 38 and aft strut 40 that assist in maintaining shaft 24 spaced a fixed distance from LPT case 23E.

Struts 38 and 40 provide rigid spacers that directly connect shaft 24 with stationary elements within engine 10, such as case 23D, case 23E, vane 41 or vane 42. In one embodiment, strut 38 and strut 40 comprise annular disk-like members that completely encircle shaft 24. In other embodiments, strut 38 and strut 40 comprise intermittent shaft-like members that provide radial "wagon wheel" support to shaft 24. In the embodiment shown, the outer end of aft strut 40 extends from the inner diameter end of exit guide vane 42, which is rigidly connected with static LPT case 23E. The inner end of aft strut 40 is joined with flange 62 of lubrication system 64. Bearing 25C is disposed between flange 62 and shaft 24. Lubrication system 64 comprises a dispensing system for providing lubricating oil to bearing 25C and includes a horizontally extending conduit member (not shown) that extends along centerline CL within shaft 24. Lubrication system 64 also includes sealing elements 66 that retain the lubricating oil within lubrication system 64 and shaft 24. Lubrication system 64 remains stationary during operation of engine 10 such that flange 64, strut 40 and exit guide vane 42 provide a rigid, direct link between bearing 25C and LPT case 23E. As such, the position of the aft end of shaft 24 located downstream of support rotor 36 is maintained a fixed distance from case 23E. Likewise, a middle segment of shaft 24 upstream of support rotor 36 is maintained a fixed distance from case 23E through a similar rigid support system.

In the embodiment of FIG. 3, shaft 24 includes platform 68 upon which bearing 25D is positioned. Platform 68 includes radially extending portion 70, which provides radial clearance from shaft 24, and axially extending portion 72, which provides a base for mounting bearing 25D. Platform 68 thus provides a pocket in which other components or systems of engine 10 can be mounted. Platform 68 provides additional space within case 23E and case 23D without adding to the diameter or length of engine 10. For example, the space inside platform 68 is used to store bearing support elements (not shown) for HPT 20 (FIG. 1) in one embodiment of the invention. Bearing 25D is still directly and rigidly disposed between stationary support elements and rotating shaft 24. Axial flange 58 of support rotor 36 includes a radially extending element that joins with radial extending portion 70 of platform 68 at spline 74. Thus, platform 68 is rigidly connected with shaft 24 through axial flange 58 such that support rotor 36, platform 68 and shaft 24 rotate as a unit. Bearing 25D is positioned on axially extending portion 72 of platform 68. Bearing 25D is provided with a lubrication system (not shown) comparable to that of lubrication system 64. Sealing element 76 confines the lubricating oil within the lubricating system. Forward strut 38 extends from bearing 25D radially out to the inner diameter end of exit guide vane 41, which is bolted to LPT case 23E through mid-turbine frame of case 23D. Thus, the spacing between LPT case 23E from platform 68 of shaft 24 is maintained fixed through the rigid connection of case 23D, exit guide vane 41 and forward strut 38.

The low pressure spool of engine 10 is provided with two structural systems that provide direct support to the portion of shaft 24 supporting LPT 22. The structural systems are provided with bearings that straddle rotor support 36 of LPT 22 to stabilize shaft 24 during rotation. Each structural system is connected with LPT case 23E by rigid, stationary members to prevent radial displacement of shaft 24 within LPT case 23E. The precise positioning of the structural systems forward and aft of rotor support 36 are determined to assist in controlling vibration of shaft 24 and tilt of support rotor 36. As such, clearances of LPT blades 32 with LPT case 23E are maintained within a smaller tolerance band such that leakage of primary air AP around the tips of blades 32 is reduced and the efficiency of engine 10 increases, as compared to engines not employing the bearing support system of the present invention. Furthermore, the structural systems permit smaller sizing of shaft 24, which permits size reduction of engine 10 or clears space within engine 10.

Although the present invention has been described with reference to preferred embodiments, workers skilled in the art will recognize that changes may be made in form and detail without departing from the spirit and scope of the invention.

The invention claimed is:

1. A bearing mounting system for supporting a low pressure turbine in a gas turbine engine, the bearing mounting system comprising:
 a low pressure shaft configured to rotate about an engine centerline;
 a single support rotor connecting the low pressure shaft with a plurality of low pressure turbine blades;
 a platform comprising:
  a radially extending portion coupled to the single support rotor at a spline; and
  an axially extending portion spaced radially from the low pressure shaft by the radially extending portion to define a pocket;
 a forward bearing support and an aft bearing support that straddle the support rotor;
  wherein the forward bearing support and the aft bearing support provide direct rigid connections to a low pressure turbine case surrounding the low pressure turbine blades;
  wherein the forward bearing support includes a radially extending strut that connects to the low pressure turbine case through a mid-turbine frame and a forward exit guide vane; and
  wherein the aft bearing support includes:
   a radially extending strut that connects to the low pressure turbine case through an aft exit guide vane; and
   a flange coupled to the radially extending strut adjacent the low pressure shaft to define a space for retaining lubrication oil;
 a forward bearing disposed between the axially extending portion of the platform and the radially extending strut of the forward bearing support; and
 an aft bearing disposed between the flange of the aft bearing support and the low pressure shaft.

2. The bearing mounting system of claim 1 wherein the support rotor is disposed near a center of mass of the low pressure turbine.

3. The bearing mounting system of claim 2 wherein:
 the low pressure turbine comprises a plurality of rotor disks jointed to form a rotor stack; and
 the support rotor comprises a conical, annular body that is integrally connected with one of the rotor disks at an outer diameter end, and connected at an inner diameter end to the low pressure turbine shaft through a spline.

4. The bearing mounting system of claim 1 wherein the forward bearing support and the aft bearing support maintain the low pressure turbine shaft at a fixed distance from the low pressure turbine case.

5. The bearing mounting system of claim 1 wherein the low pressure turbine shaft extends axially within the forward and aft bearings.

6. The bearing mounting system of claim 1 wherein the forward bearing and the aft bearing are positioned to control vibration of the low pressure shaft.

7. The bearing mounting system of claim 1 and further comprising
 a plurality of knife edge seal elements disposed at radial tips of the plurality of low pressure turbine blades;
 a low pressure turbine case surrounding the plurality of low pressure turbine blades; and
 a plurality of abradable seal elements lining an interior surface of the low pressure turbine case to mate with the plurality of knife edge seal elements;
 wherein the forward bearing and the aft bearing are positioned to control blade tip leakage.

8. The bearing mounting system of claim 1 wherein the forward bearing and the aft bearing are positioned to control tilting of the single support rotor.

9. The bearing mounting system of claim 1 wherein the single support rotor comprises a single conical member positioned on a portion of the low pressure turbine shaft disposed between the forward bearing and the aft bearing.

10. The bearing mounting system of claim 1 wherein the forward bearing is positioned forward of the plurality of low pressure turbine blades and the aft bearing is positioned in the middle of the plurality of low pressure turbine blade.

11. A bearing mounting system for supporting a low pressure turbine in a gas turbine engine, the bearing mounting system comprising:
 a low pressure shaft configured to rotate about an engine centerline;
 a single support rotor connecting the low pressure shaft with a plurality of low pressure turbine blades;
 a forward bearing support and an aft bearing support that straddle the support rotor; wherein the forward bearing support and the aft bearing support provide direct rigid connections to a low pressure turbine case surrounding the low pressure turbine blades;
 a forward bearing disposed between the forward bearing support and the low pressure shaft; and
 an aft bearing disposed between the aft bearing support and the low pressure shaft;
 wherein the forward bearing is spaced from the low pressure shaft by a platform that provides clearance between the platform and the low pressure shaft.

12. The bearing mounting system of claim 11 wherein the support rotor is disposed near a center of mass of the low pressure turbine.

13. The bearing mounting system of claim 12 wherein:
 the low pressure turbine comprises a plurality of rotor disks jointed to form a rotor stack; and
 the support rotor comprises a conical, annular body that is integrally connected with one of the rotor disks at an outer diameter end, and connected at an inner diameter end to the low pressure turbine shaft through a spline.

14. The bearing mounting system of claim 11 wherein the forward bearing support and the aft bearing support maintain the low pressure turbine shaft at a fixed distance from the low pressure turbine case.

15. The bearing mounting system of claim 11 wherein the low pressure turbine shaft extends axially within the forward and aft bearings.

16. The bearing mounting system of claim 11 wherein the forward bearing and the aft bearing are positioned to control vibration of the low pressure shaft.

17. The bearing mounting system of claim 11 and further comprising
   a plurality of knife edge seal elements disposed at radial tips of the plurality of low pressure turbine blades;
   a low pressure turbine case surrounding the plurality of low pressure turbine blades; and
   a plurality of abradable seal elements lining an interior surface of the low pressure turbine case to mate with the plurality of knife edge seal elements;
   wherein the forward bearing and the aft bearing are positioned to control blade tip leakage.

18. The bearing mounting system of claim 11 wherein the forward bearing and the aft bearing are positioned to control tilting of the single support rotor.

19. The bearing mounting system of claim 11 wherein the single support rotor comprises a single conical member positioned on a portion of the low pressure turbine shaft disposed between the forward bearing and the aft bearing.

20. The bearing mounting system of claim 11 wherein the forward bearing is positioned forward of the plurality of low pressure turbine blades and the aft bearing is positioned in the middle of the plurality of low pressure turbine blade.

\* \* \* \* \*